United States Patent [19]

Himmelstein

[11] 4,320,463

[45] Mar. 16, 1982

[54] PRODUCTION CONTROL SYSTEM

[75] Inventor: Sydney Himmelstein, Lake Bluff, Ill.

[73] Assignee: S. Himmelstein and Company, Hoffman Estates, Ill.

[21] Appl. No.: 123,932

[22] Filed: Feb. 25, 1980

[51] Int. Cl.³ .................................. G06F 15/46
[52] U.S. Cl. .......................... 364/552; 364/472; 364/563
[58] Field of Search .............. 364/552, 554, 111, 112, 364/469, 470, 472, 563

[56] References Cited

U.S. PATENT DOCUMENTS

| | | | |
|---|---|---|---|
| 3,496,344 | 2/1970 | Chope | 364/554 |
| 3,610,899 | 10/1971 | Dahlin | 364/471 X |
| 3,612,839 | 10/1971 | DeWitt et al. | 364/554 |
| 3,704,362 | 11/1972 | Kolby et al. | 364/552 |
| 3,763,361 | 10/1973 | Smart | 364/552 |
| 3,816,721 | 6/1974 | Turner | 364/552 |
| 3,881,651 | 5/1975 | Wilhelm, Jr. | 364/552 X |
| 3,946,211 | 3/1976 | Nakao et al. | 364/552 |
| 3,952,185 | 4/1976 | Stultz et al. | 364/552 X |
| 4,109,511 | 8/1978 | Powers, Jr. et al. | 364/554 X |
| 4,136,396 | 1/1979 | Hansford | 364/554 |

Primary Examiner—Edward J. Wise
Attorney, Agent, or Firm—Wegner, Stellman, McCord, Wood & Dalton

[57] ABSTRACT

A production control system wherein statistical determinations are continuously made on the basis of current manufacturing process data corresponding to preselected parameters of the product being manufactured. The control method includes a determination of the mean ±3 standard deviations of statistical samples. The method further includes the step of determining whether the mean ±3 standard deviation is within preselected permissible limits. Parameter determinations which are outside the permissible limits may be signalled for suitable action. In one form, the method includes the feedback of control signals to the manufacturing apparatus for effecting automatic corrective adjustment thereof when necessary. The determinations may be made by a statistical computer with information as to the product parameters being provided to the computer from conventional sensing devices.

3 Claims, 2 Drawing Figures

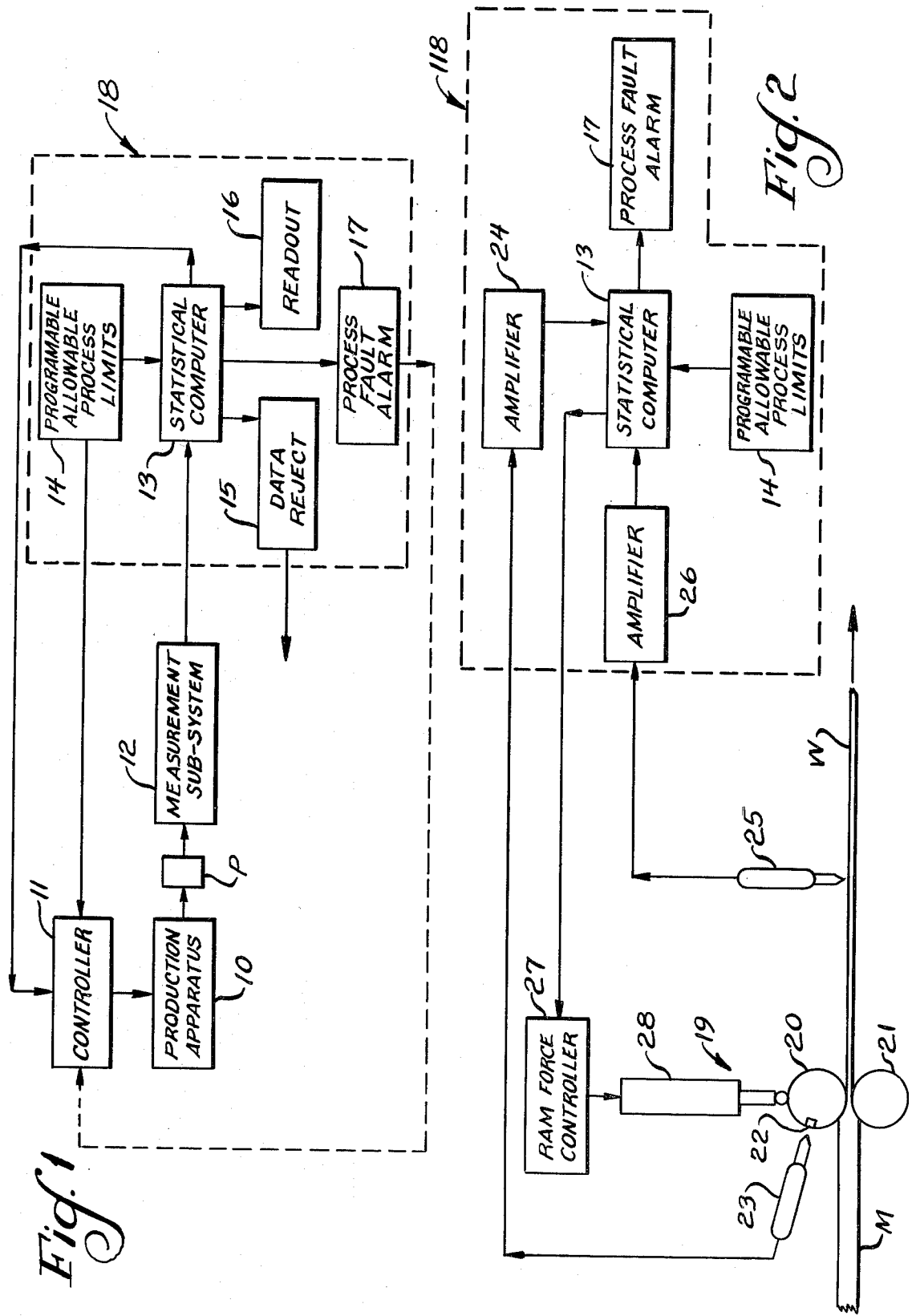

PRODUCTION CONTROL SYSTEM

BACKGROUND OF THE INVENTION

1. Technical Field

This invention relates to manufacturing process controls, and in particular to the controlling of a product manufacturing process to maintain the product parameters within preselected permissible limits.

2. Background Art

In manufacturing processes, including those of forming a plurality of individual products and those wherein a single product is continuously formed, it is desirable to monitor different parameters of the products so as to minimize rejection and scrap. To this end, sensing devices have been developed which provide indications of desired parameter values during the manufacture of the products. Illustratively, where a web is being manufactured from a thick mat by a compression process, the thickness parameter of the produced web may be constantly sensed. Means may be provided for signalling an out-of-tolerance condition so that the manufacturer may make suitable adjustments in the apparatus to bring the thickness parameter back to within the desired limits.

In certain manufacturing processes, feedback controls are provided for automatically adjusting the apparatus as a function of the parameter determinations. A problem arises in the conventional manufacturing process due to the production of random out-of-tolerance products which may be caused to be out of tolerance for a number of reasons, each of which is directed primarily to a single one of the products. Thus, while a series of products may be manufactured in an automatic manufacturing process which are generally within tolerance, every now and then a product is produced which, for some reason, is out of tolerance and is, therefore, caused to be rejected. The conventional automatic production test equipment satisfactorily separates such reject products from the products within the desired tolerance limits and, thus, provides for basic quality control.

However, in conventional manufacturing processes, progressive failures may occur which are not random, but rather, affect the entire production. Illustratively, such progressive failures may be due to gradual dulling of cutting tools, loss of calendar roll preload, introduction of supplies of defective raw material or use of defective subassemblies, etc.

Such nonrandom degradation occurs gradually and over a long period of time and, thus, is difficult to detect and therefore, in many cases, remains uncorrected so as to cause substantial scrap loss. Because of the nature of such nonrandom degradation, it must be detected by statistical methods which heretofore have not been suitable for effecting immediate correction.

SUMMARY OF THE INVENTION

The present invention comprehends a novel method of controlling a product manufacturing process wherein nonrandom progressive degradation is detected and signalled immediately as it occurs.

The invention makes immediate corrective action possible and, in one form, such correction is effected by control of the manufacturing apparatus by the degradation determining means.

More specifically, the invention comprehends such a method of controlling a product manufacturing process which includes the steps of determining limits of permissible variations in a parameter of the product being manufactured, sequentially determining the value of the parameter as the product is manufactured, determining the mean ±3 standard deviations of a first preselected group of the sequentially determined values, determining the mean ±3 standard deviations of a different preselected group of the sequentially determined values, the different group including the next value determined subsequent to those of the previous group and all but the first determined value of the previous group, repeating the last named step throughout the process, and providing a signal as an incident of the determined mean ±3 standard deviations going outside of the permissible limits.

In an alternate form, the invention comprehends a method of controlling a process of manufacturing a batch of products including the steps of determining limits of permissible variations in a parameter of the products being manufactured, sequentially determining the value of the parameter of each product of the batch as the batch is manufactured, determining the mean ±3 standard deviation of the determined values omitting any values falling outside the permissible limits, providing a signal as an incident of the determined mean ±3 standard deviation going outside of the permissible limits, and providing a signal as an incident of determining any value outside the permissible limits.

The process may comprise the sequential manufacture of a plurality of similar individual products and the step of determining the value of the parameter comprises a step of determining the value of the parameter of each of the individual products.

Alternatively, the process may comprise the continuous manufacture of a product and the step of determining the value of the parameter comprises a step of determining the value of the parameter at sequentially formed portions of the product as they are formed.

In the illustrated embodiment, values falling outside the permissible limits may be signalled to the user for rejecting such out-of-limits products.

In making the mean ±3 standard deviation determinations, the calculations may be made with either N or $N-1$ weighting, as desired.

The method of controlling the product manufacturing processes of the present invention is extremely simple and economical and provides a substantial improvement in the quality control art.

BRIEF DESCRIPTION OF THE DRAWING

Other features and advantages of the invention will be apparent from the following description taken in connection with the accompanying drawing wherein:

FIG. 1 is a block diagram of a method of controlling a product manufacturing process embodying the invention; and FIG. 2 is a block diagram of a modified form of such a method embodying the invention.

DESCRIPTION OF THE PREFERRED EMBODIMENTS

In the illustrative embodiment of the invention as disclosed in FIG. 1 of the drawing, control of a production apparatus 10 may be effected by a conventional controller 11. The invention is not directed to any particular form of production apparatus or product manufactured thereby, as will be obvious to those skilled in the art. Similarly, any suitable controller for providing desired control of the operation of the production apparatus is comprehended within the scope of the invention, as will be obvious to those skilled in the art.

As further shown in FIG. 1, a measurement subsystem 12 is provided for making determinations of the values of preselected parameters of the product P being manufactured by apparatus 10. Illustratively, for a simplified understanding of the novel method, product P can be assumed to be a cube having 1" nominal dimensions. Thus, for simplified illustration, it may be assumed that the measurement subsystem 12 determines the height of the cubic products P as the sensed parameter thereof.

As shown in FIG. 1, the sensed parameter is fed to a statistical computer 13.

In conducting the manufacturing process, the manufacturer may select certain tolerance limits in the parameters being sensed so that quality control determinations may be made as to whether these parameters of the products are within the permissible tolerance limits. In the illustrated embodiment, the allowable process limits are provided in a suitable programmable control 14 which provides this information to the statistical computer 13 and, further, provides this information to the apparatus controller 11.

As indicated briefly above, random failures in the products P may occur from time to time. Thus, illustratively, the height of the product P being sensed may be relatively low because of defective material which broke off during the forming process. This low height would be outside of the set allowable process limits and, thus, would be determined by the statistical computer to represent a random failure, which determination is provided to a data reject control 15 for suitably identifying or automatically removing the defective product P from the products being delivered from the apparatus.

As further indicated briefly above, the invention comprehends a determination of nonrandom, progressive failure in the manufacturing process which is not directly related to the random failures discussed above. More specifically, the invention comprehends sequentially determining the value of the parameter as each product is manufactured and utilizing this determined value and determining the mean ±3 standard deviations of a first preselected group of the sequentially determined values of the sequentially formed products P. Thus, for example, in the simple cubic product case, the allowable process limits may be 0.9" and 1.1". It may be assumed that the product apparatus is producing cubic products P wherein the height parameter is nominally 1" but, because of normal statistical deviation, varies above and below the normal dimension from product to product. This condition would be illustrative of a starting condition wherein no nonrandom or progressive failure has occurred. After a number of products, however, have been manufactured by the process, a progressive decrease in the height of the product P may result from a progressive weakening of a control spring. Thus, the mean parameter, or height value, would be decreasing during the manufacturing process. This progressive decrease in the mean value would be sensed by the subsystem 12 and delivered to the computer 13. The computer may immediately make the mean ±3 standard deviation determination relative to a preselected group of the products so that, at all times, a signal may be delivered to a readout device 16 indicating this progressive change in the mean ±3 standard deviation value of the parameter. As further illustrated in FIG. 1, a similar signal corresponding to the mean ±3 standard deviations may be delivered back to the controller for use in automatically controlling the production apparatus 10.

In the event the nonrandom, progressive failure determined by computer 13 exceeds the allowable process limits, the determination is made available to the user at readout 16 and may be utilized through a process fault alarm control 17 to stop further operation of the production apparatus through suitable control of controller 11. In either event, the operator of the apparatus is apprised of the nonrandom failure and, thus, is caused to determine the source thereof so as to remedy the problem and avoid substantial scrap loss in the production of the products P.

As illustrated in FIG. 1, each of the process limit control 14, computer 13, data reject control 15, readout device 16, and process fault alarm control 17 may be provided in a single statistical control device generally designated 18.

The invention comprehends that the determination of the mean ±3 standard deviations be made continuously so as to provide immediate information and control. To this end, the invention comprehends that the first group of the sequentially determined product values be a suitable small statistical sample, such as 20 products P. Thus, when the height of 20 products has been sequentially determined, a computation of the mean ±3 standard deviations is made and compared with the allowable process limit information provided to the computer. Assuming that the determination is within the permissible limits, the control 18 permits continued production of the products P.

When the next product P height determination is made, this determination is delivered through the subsystem 12 to computer 13. At this time, the computer now makes a new determination of the mean ±3 standard deviations based on the determinations of all but the first of the preceding group of determinations plus the one new determination. Thus, the second determination illustratively, where the first determination was based on 20 samples, would be based on 20 samples comprising the second through 21st product being manufactured.

This progressive re-determination of the mean ±3 standard deviations is made each time a new product is manufactured and the parameter thereof sensed by the subsystem 12. Thus, a constantly updated determination of the mean ±3 standard deviations of the statistical samples is made during the entire manufacturing run after the first statistical group is produced.

As discussed above, at any time during the manufacturing run a defect occurs which is outside of the process limits, suitable signal or data reject control is effected to eliminate this product failure.

As will be obvious to those skilled in the art, the improved control of the present invention is equally applicable to a manufacturing process wherein the product is a continuously formed product, such as a web product W, as illustrated in FIG. 2. Thus, as shown in FIG. 2, the compressed web W may be formed from a mat M by a production apparatus generally designated 19 which may include a pair of compression rolls 20 and 21. The loading roll 20 may be provided with a magnetic actuator 22 which actuates a sensor 23 to provide an indication of each revolution of the loading roll 20. This signal is delivered to an amplifier 24 which provides a counting pulse signal to the statistical computer 13.

The thickness of the web may be detected by a sensor 25, with the signal from the detector 25 being provided to an amplifier 26, which provides an amplified signal corresponding to the thickness parameter of the web to the statistical computer 13.

As in this process there are effectively no data reject products, the modified control device generally designated 118 differs from the control device 18 in eliminating the data reject control 15. However, control 118 may include the process fault alarm 17 and the programmable allowable process limits control 14.

As further shown in FIG. 2, a signal may be provided by the statistical computer 13 to the ram force controller 27 which, in turn, suitably controls the hydraulic loading ram 28 acting on the adjustable loading roll 20.

Thus, in the embodiment of FIG. 2, the step of determining the value of the parameter comprises a step of determining the value of the parameter at sequentially formed portions of the web W as they are formed corresponding to the revolutions of the adjustable loading roll 20 through the sensing device 23. Thus, while the manufacturing process provides a continuously formed product W, the functioning of the control device 118 is substantially similar to the functioning of control device 18 in that a group of parameter determinations is constantly produced, permitting the determination of the mean ±3 standard deviations of the group, with the group being updated constantly each time a new increment of the continuously formed product W is formed.

Thus, broadly, the invention comprehends the method of controlling a product manufacturing process wherein allowable process limits are defined by the user. The method comprehends sequentially determining the value of the parameter to be maintained within the permissible limits as the product is being manufactured. A group of the parameter determinations is analyzed constantly to determine the mean ±3 standard deviations with the group being constantly updated as new increments of the product are formed. An output signal is provided which is a result of the determined mean ±3 standard deviations, and more specifically, is provided when that determination goes outside the selected process limits.

Where the group utilized in making the mean ±3 standard deviations determination is less than the total quantity of products being manufactured, the determination thereof is preferably made with less than full batch weighting. Illustratively, where the group size is 20 as discussed above, the determination may be made with an N−1 weighting, i.e. 19 units.

The foregoing disclosure of specific embodiments is illustrative of the broad inventive concepts comprehended by the invention.

I claim:

1. A method of controlling a continuous product manufacturing process comprising the steps of:
   preselecting permissible limits of variations in a parameter of the product being manufactured;
   sequentially determining the value of the parameter as the product is manufactured;
   determining the mean ±3 standard deviations of a first preselected group of the sequentially determined values;
   determining the mean ±3 standard deviations of a different preselected group of the sequentially determined values, said different group including the next value determined subsequent to those of the previous group and all but the first determined value of the previous group;
   repeating the last named step throughout the process;
   providing a signal as an incident of the determined permissible limits; and
   identifying products for which said determination randomly falls outside said permissible limits, the determination of the mean ±3 standard deviations being made with less than full batch weighting.

2. The method of controlling a process for manufacturing products of claim 1 wherein the individual values of the parameters of products of the manufacture are retained until intentionally cleared.

3. The method of controlling a process for manufacturing products of claim 1 further including the step of adjusting the manufacturing process as a function of the mean ±3 standard deviation determinations.

* * * * *

UNITED STATES PATENT AND TRADEMARK OFFICE
CERTIFICATE OF CORRECTION

PATENT NO. : 4,320,463
DATED : March 16, 1982
INVENTOR(S) : Sydney Himmelstein

It is certified that error appears in the above-identified patent and that said Letters Patent are hereby corrected as shown below:

Column 6, line 31, (Claim 1, line 18) before "permissible" insert:
-- mean $\pm 3$ standard deviations going outside of said--

Signed and Sealed this

Seventeenth Day of May 1983

[SEAL]

Attest:

DONALD J. QUIGG

Attesting Officer     Acting Commissioner of Patents and Trademarks